(12) United States Patent
Öllgaard

(10) Patent No.: US 8,593,010 B2
(45) Date of Patent: Nov. 26, 2013

(54) WIND TURBINE

(75) Inventor: Börge Öllgaard, Esbjerg (DK)

(73) Assignee: Vestas Wind Systems A/S, Aarhus N (DK)

( * ) Notice: Subject to any disclaimer, the term of this patent is extended or adjusted under 35 U.S.C. 154(b) by 41 days.

(21) Appl. No.: 13/132,021

(22) PCT Filed: Jan. 7, 2010

(86) PCT No.: PCT/EP2010/050093
§ 371 (c)(1),
(2), (4) Date: Jun. 1, 2011

(87) PCT Pub. No.: WO2010/081758
PCT Pub. Date: Jul. 22, 2010

(65) Prior Publication Data
US 2011/0254283 A1    Oct. 20, 2011

Related U.S. Application Data

(60) Provisional application No. 61/144,219, filed on Jan. 13, 2009.

(30) Foreign Application Priority Data

Jan. 13, 2009   (DK) ................................. 2009 00045

(51) Int. Cl.
*F03D 9/00*       (2006.01)
*F03D 11/00*      (2006.01)

(52) U.S. Cl.
USPC ............................................................ 290/55

(58) Field of Classification Search
USPC ......................................... 310/127, 128, 231
See application file for complete search history.

(56) References Cited

U.S. PATENT DOCUMENTS 4,423,333 A * 12/1983 Rossman ........................ 290/44
5,436,508 A *  7/1995 Sorensen ....................... 290/55

FOREIGN PATENT DOCUMENTS

EP      1 036 937       9/2000
FR      2 467 304       4/1981

(Continued)

OTHER PUBLICATIONS

Raffaele Di Renzo; International Search Report and Written Opinion issued in priority International Application No. PCT/EP2010/050093; Nov. 5, 2010; 11 pages; European Patent Office.

(Continued)

*Primary Examiner* — Tulsidas C Patel
*Assistant Examiner* — Sean Gugger
(74) *Attorney, Agent, or Firm* — Wood, Herron & Evans, LLP

(57) ABSTRACT

The present invention relates to a wind turbine including a tower, a nacelle arranged on top of the tower and a slip ring assembly having at least one slip ring, wherein a first cable is extending from the nacelle to the tower via an interior bore of the slip ring assembly, and at least one second cable is extending from the nacelle to the tower via the at least one slip ring, whereby a shielding distance is formed between an outer periphery of said first cable and an inner circumference of the at least one slip ring. The present invention further relates to use of a slip ring assembly comprising at least one slip ring for shielding cables in a wind turbine.

20 Claims, 3 Drawing Sheets

(56) References Cited

FOREIGN PATENT DOCUMENTS

| | | | |
|---|---|---|---|
| GB | 674 651 | | 6/1952 |
| GB | 2 167 612 | | 5/1986 |
| GB | 2167612 A | * | 5/1986 |
| JP | 2000-274347 | | 3/2000 |
| JP | 2006-104969 | | 4/2006 |

OTHER PUBLICATIONS

Carsten Nielsen; 1st Technical Examination report issued in priority Denmark Application No. PA 2009 00045; Aug. 24, 2009; 5 pages; Denmark Patent and Trademark Office.
European Patent Office, Notice of Allowance issued in corresponding EP Application No. 10700055.6-1610 dated Apr. 8, 2013, 24 pages.

* cited by examiner

WIND TURBINE

TECHNICAL FIELD

The present invention generally relates to a wind turbine comprising a tower, a nacelle and a slip ring assembly having at least one slip ring. A first cable is extending via an interior bore of the slip ring assembly and at least one second cable is extending via the at least one slip ring. A shielding distance is formed between an outer periphery of the first cable and an inner circumference of the at least one slip ring. The present invention further relates to use of a slip ring assembly comprising at least one slip ring for shielding cables in a wind turbine.

BACKGROUND OF THE INVENTION

A wind turbine generally comprises a tower, a nacelle, at least one blade and a yaw bearing arranged between the tower and the nacelle. A high voltage cable is drawn from a generator arranged in the nacelle, down to the ground through the interior space of the tower. Generally, the cable has a diameter of 60-110 mm. This high voltage cable is not the only cable extending from the nacelle through the interior of the tower, but also other additional cables, such as signal cables or the like, are extending in the same manner through the tower. Normally, these cables are mounted on the outer surface of the high voltage cable. To avoid disturbances from the high voltage cable, the latter must be provided with an outer shielding, thereby increasing its thickness, weight and cost.

In operation, the nacelle is turned around the yaw bearing in order for the blades to be correctly oriented towards the wind. This turning is transferred to the cables, thereby twisting or turning the same. In order to allow for this twisting, the cables must have a free length, which is hanging centrally through the upper section of the tower. Along the lower sections of the tower, the cables are fixed to the inner wall of the tower. Along the wall, the additional cables and the high voltage cable are separated. Thus, the twisting is generally restricted to the free length of the cables along the upper section of the tower only.

Normally, the nacelle is allowed to be turned about five turns before it must be re-turned to its original position in order to avoid any damages to the cables.

Due to the extra shielding of the high voltage cable, which is required for avoiding disturbances on the additional cables arranged in the tower, the high voltage cable becomes expensive and heavy.

Additionally, all cables must be made with an extra length in order to allow for the twisting due to the turning of the nacelle, which additionally adds to the weight and cost of the cables.

GB 2 167 612 discloses a wind-turbine generator system having a nacelle-mounted generator provided with a slip ring assembly. The power cable from the generator is extending from the nacelle to the tower via the slip ring.

SUMMARY OF THE INVENTION

In view of the above, an objective of the invention is to provide an improvement over the above described techniques and prior art.

In particular, an objective is to reduce the weight and cost of the high voltage cable.

Another objective is to reduce the need for outer shielding arranged around the high voltage cable.

According to a first aspect, the present invention is realised by a wind turbine comprising a tower, a nacelle arranged on top of the tower and a slip ring assembly having at least one slip ring, wherein a first cable is extending from the nacelle to the tower via an interior bore of the slip ring assembly, and at least one second cable is extending from the nacelle to the tower via the at least one slip ring, whereby a shielding distance is formed between an outer periphery of the first cable and an inner circumference of the at least one slip ring.

An advantage is that the first cable is separated from the at least one second cable by means of the slip ring assembly forming shielding. The first cable is extending through the interior bore of the slip ring assembly. The first cable is extending via the at least one slip ring, for example by a first portion of the at least one second cable being connected to the at least one slip ring of the slip ring assembly. Signals and/or power transmitted in the at least one second cable are passing through the slip ring assembly. For example, a second portion of the at least one second cable may be connected to a stationary part of the slip ring assembly, and the second portion of the at least one second cable may then be guided from the slip ring assembly towards the tower wall or a ladder arranged in the tower. If a plurality of second cables is provided, each second cable is connected to a separate slip ring. The first cable may be a high voltage cable, or the like, and the at least one second cable may be any additional cable such as a signal cable, power cable, or the like.

Another advantage is that the need for outer shielding at the first cable is reduced, due to the separation of the first cable and the at least one second cable via the slip ring assembly. Instead of using outer shielding at the first cable, the shielding distance between the outer periphery of the first cable and the inner circumference of the at least one slip ring, formed by the slip ring assembly, ensures that the at least one slip ring is arranged at a predetermined distance from the first cable such that sufficient shielding is achieved. The shielding may be provided by air, material or an element arranged in the interior bore of the slip ring assembly, or a combination thereof. By reducing the need for outer shielding, the weight and the cost of the first cable can be reduced.

A further advantage is that since the at least one second cable is not attached to the first cable, the first cable is independently and freely arranged in view of the at least one second cable, and vice versa. Consequently, the first cable may turn or twist inside the interior bore of the slip ring assembly without turning or twisting the at least one second cable. Also, since the at least one second cable is connected to the slip ring being rotatable, the at least one second cable is free to rotate in view of the first cable. When the nacelle turns around the yaw bearing, the first cable and the at least one second cable may not necessarily be turned to the same extent.

The at least one second cable may be extending from the nacelle to the tower via said at least one slip ring by a first portion of the at least one second cable being connected to a first terminal of the at least one slip ring, and a second portion of the at least one second cable being connected to a second terminal of the slip ring assembly. Thereby, signals and/or power transmitted by the first portion of the at least one second cable are passing through the slip ring assembly to the second portion of the at least one second cable.

The second terminal may be arranged on a stationary part of the slip ring assembly.

The shielding distance between a circumference of the interior bore and the outer periphery of the first cable may be at least 130 mm. Such a distance has been shown to generally ensure that sufficient shielding is achieved in wind power applications when a high voltage cable is to be insulated using only the distance for shielding. Naturally, the required distance is dependent on material used to shield the first cable, type of signals transmitted by the first cable, power transmitted in the first cable, etc. For example, the shielding may be obtained by air, by a shielding material, a distance member, or by a combination thereof.

The shielding distance may be ensured by a distance member extending between the slip ring assembly and the first cable. The distance member ensures that a sufficient distance is maintained between the slip ring assembly, in which signals and/or power from the at least second cable is transmitted, and the first cable such that shielding is obtained there between.

The slip ring assembly may be of a barrel type or of a face type. In a barrel type slip ring assembly, the slip rings are arranged one on top of each other. One second cable may be connected to the top slip ring, another second cable may be connected to the next slip ring arranged below the top slip ring, etc. In the barrel type slip ring assembly, each second cable is connected to a separate slip ring. In a face type slip ring assembly, the slip rings are arranged on a face of a disc, one slip ring being arranged inside the other. In the face type slip ring assembly, each second cable is connected to a separate slip ring.

The slip ring assembly may be attached to the nacelle. Thereby, the at least one slip ring rotates when the nacelle turns.

The slip ring assembly may be attached to a cable tray adapted to support the first cable. The cable tray is adapted to support and guide the first cable towards the interior bore of the slip ring assembly.

The slip ring assembly may be attached to the tower. Alternatively, or as a complement, the stationary part of the slip ring assembly may be attached to and supported by the tower.

The slip ring assembly may comprise the at least one slip ring and a stationary part, the at least one slip ring may be attached to the nacelle and the stationary part may be attached to the tower.

The at least one second cable may be guided away from the first cable after having passed the slip ring assembly. The at least one second cable may be guided towards, for example, the tower wall or a ladder arranged in the tower, and may extend along the wall or the ladder towards a lower portion of the tower.

According to a second aspect, the present invention is realised by use of a slip ring assembly comprising at least one slip ring for shielding cables in a wind turbine, wherein a first cable is extending through an interior bore of the slip ring assembly, and at least one second cable is extending via the at least one slip ring, whereby a shielding distance is formed between an outer periphery of the first cable and an inner circumference of said at least one slip ring.

An advantage of using a slip ring assembly for shielding between the first cable extending through the interior bore and the slip ring forwarding signals and/or power from the at least one second cable is that the need for outer shielding at the first cable is reduced, due to the separation of the first cable and the at least one second cable via the slip ring assembly. Instead of using outer shielding of the first cable, the shielding distance between the outer periphery of the first cable and the inner circumference of the at least one slip ring, formed by the slip ring assembly, ensures that the at least one slip ring is arranged at a predetermined distance from the first cable such that sufficient shielding is achieved. The shielding may be provided by air, a material arranged in the interior bore of the slip ring assembly, or a combination thereof. By reducing the need for outer shielding, the weight and the cost of the first cable can be reduced.

A further advantage is that since the at least one second cable is not attached to the first cable, the first cable is independently and freely arranged in view of the at least one second cable, and vice versa. Consequently, the first cable may turn or twist inside the interior bore of the slip ring assembly without turning or twisting the at least one second cable. Due to the at least one second cable extending via the at least one slip ring, the at least one second cable is free to turn in view of the first cable. When the nacelle is turned around the yaw bearing, the first cable and the at least one second cable may not necessarily be turned to the same extent.

The at least one second cable may be extending via the at least one slip ring by a first portion of the at least one second cable being connected to a first terminal of the at least one slip ring, and a second portion of the at least one second cable being connected to a second terminal of the slip ring assembly. Thereby, signals and/or power transmitted by the first portion of the at least one second cable are passed through the slip ring assembly to the second portion of the at least one second cable.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
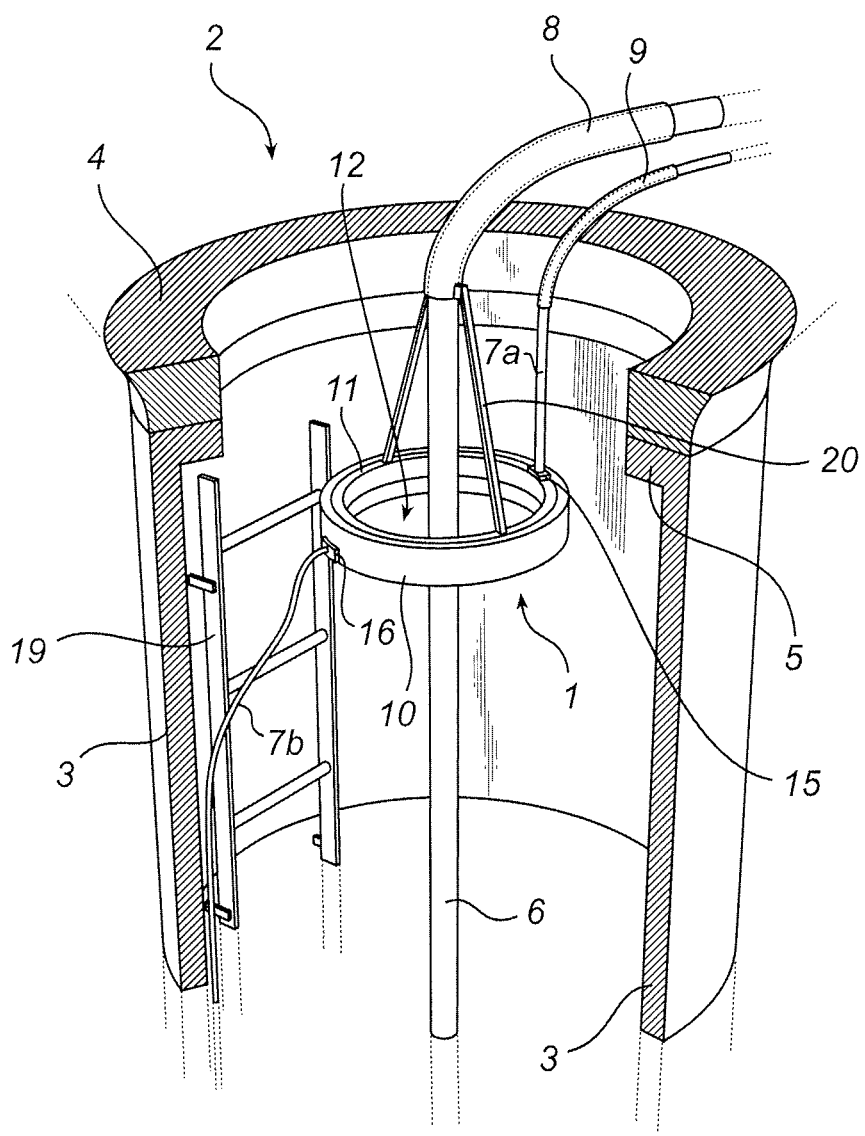
FIG. 1 schematically illustrates a slip ring assembly arranged in a wind turbine.
Figure 2:
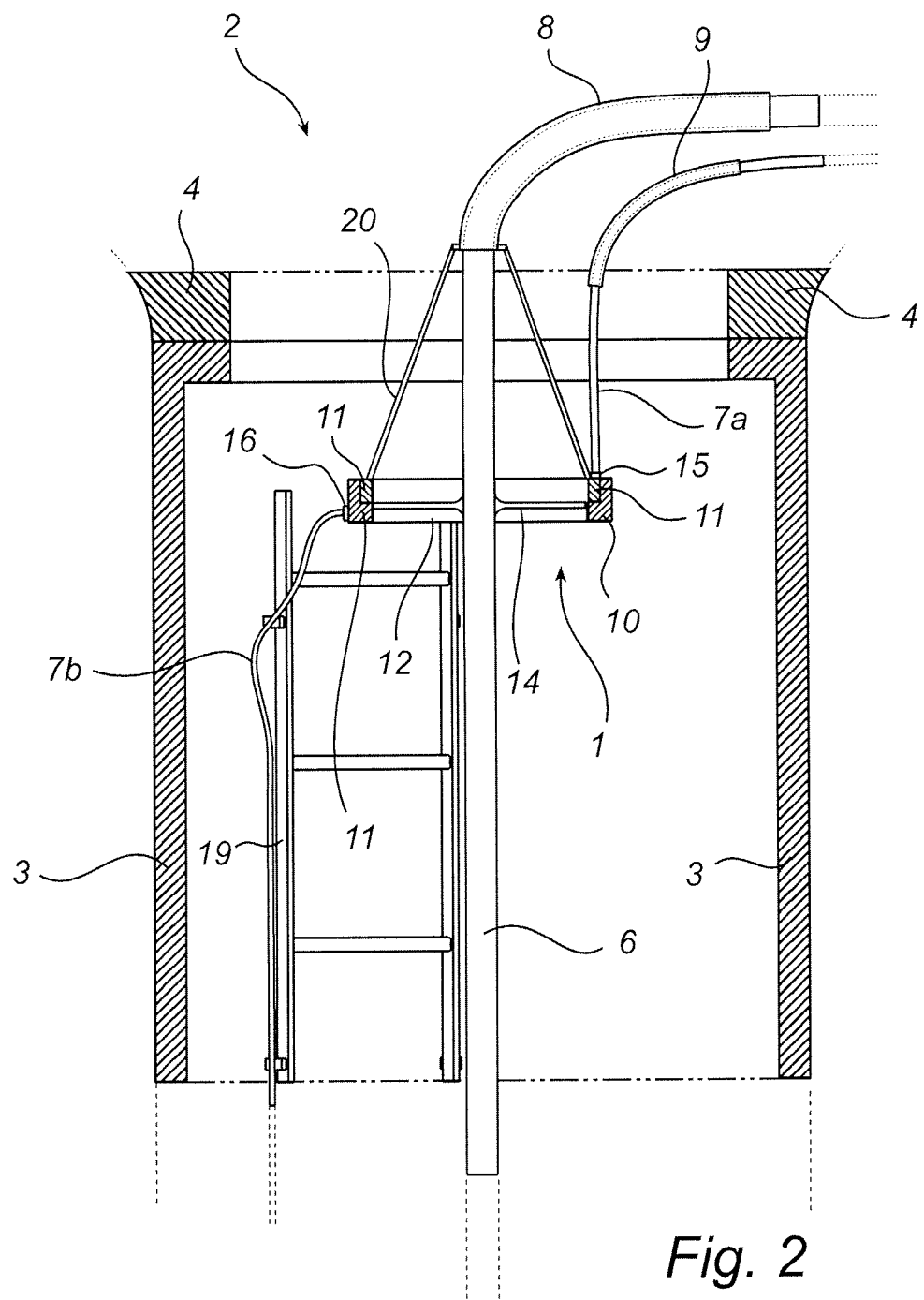
FIG. 2 schematically illustrates a cross-section of the slip ring assembly in FIG. 1 arranged in the wind turbine.

With reference to FIGS. 1 and 2, a slip ring assembly 1 used in a wind turbine 2 will be described. The wind turbine 2 comprises a tower 3, a nacelle 4 arranged on top of the tower 3 and a slip ring assembly 1. The slip ring assembly 1 is arranged in an upper section of the wind turbine tower 3, adjacent a top flange 5 of the tower 3. The tower 3 is extending from the ground to the nacelle 4. Bearings (not shown) may be arranged between the tower 3 and the nacelle 4, thereby allowing turning of the nacelle 4 in view of the tower 3. A first cable 6, which may be a high voltage cable or the like, is extending from the nacelle 4 towards the ground through the interior of the tower 3 in a vertical direction. At least one second cable 7a, 7b is also extending from the nacelle 4 towards the ground in the vertical direction. The at least one second cable 7a, 7b may be a signal cable, or any other cable arranged in the tower 3.

In order to facilitate the understanding of the invention, only one second cable is disclosed unless nothing else is given.

The slip ring assembly 1 comprises at least one slip ring 11 being rotatable and a stationary part 10. The slip ring assembly 1 is annular shaped and has an interior bore 12 extending in an axial direction. Signals and/or power is transmitted from the slip ring 11 to the stationary part 10, or vice versa, via slip ring brushes (not shown) forming a connection between the rotatable slip ring 11 and the stationary part 10. The slip ring assembly 1 is of any conventional type, which function and design will easily be appreciated by a person skilled in the art, whereby it will not be described in more detail.

The first cable 6 is extending through the interior bore 12 of the slip ring assembly 1 in the vertical direction. A distance member 14, such as a disc or spokes, or a material filling the interior bore, may be arranged in the interior bore 12. The distance member 14 may be extending between an interior circumferential surface of the slip ring assembly 1 and an outer periphery of the first cable 6. The distance member 14 ensures that a sufficient distance is maintained between the first cable 6 and the slip ring assembly 1 for obtaining the desired shielding of the first cable 6. An example of a distance member 14 is shown in FIG. 2.

A first cable tray 8 may be adapted to guide the first cable 6 towards the interior bore 12 of the slip ring assembly 1. A second cable tray 9 may be adapted to guide a first portion 7a of the at least one second cable towards the slip ring assembly 1.

The slip ring assembly 1 is attached to the first cable tray 8 by a support structure 20, which is shown in FIG. 2. The support structure 20 is attached to the rotatable part of the slip ring assembly 1, i.e. the at least one slip ring 11. Thereby, the support structure 20, the at least slip ring 11 and the first portion 7a of the at least one second cable rotate together when the nacelle turns. Alternatively, the stationary part 10 of the slip ring assembly 1 may be attached to the tower 3, or the slip ring assembly 1 may be attached to both the support structure 20 and to the tower 3.

The at least one second cable is divided into the first portion 7a and a second portion 7b. The first portion 7a of the at least one second cable is connected the least one slip ring 11 by means of a first terminal 15. The at least one slip ring 11 transmits a signal and/or power from the first portion 7a of the at least one second cable to the stationary part 10 of the slip ring assembly 1 via slip ring brushes (not shown). The second portion 7b of the at least one second cable is connected to a second terminal 16 of the stationary part 10 of the slip ring assembly 1. The signals and/or power is further transmitted towards the ground by means of the second portion 7b of the at least one second cable.

The slip ring assembly 1 forms a distance between the first cable 6, extending through the interior bore 12 of the slip ring assembly 1, and the slip ring 11 and the stationary part 10. As the first cable 6 extends through the interior bore 12 and the at least one second cable 7a, 7b is connected to the at least one slip ring 11, the distance forms a shielding between the first cable 6 and the slip ring assembly 1. Thereby, the first cable 6 is separated from the signals and/or power transmitted by the at least one second cable 7a, 7b via the at least one slip ring 11.

Consequently, the risk for disturbance from the first cable 6, such as a high voltage cable, is reduced.

The shielding may be obtained by the distance only, or by a combination of distance and shielding material. In case of distance only, the distance between the circumference of the interior bore and the outer periphery of the first cable is preferably at least 130 mm. Alternatively, or as a combination thereto, a shielding material may be arranged in the interior bore 12. Further, a distance member 14 may be arranged in the interior bore 12, extending between the slip ring assembly 1 and the first cable 6. The distance member 14 ensures that a sufficient distance is maintained between the first cable 6 and the slip ring assembly 1. Depending on the design of such a distance member, it may add to the shielding effect. For example, if the interior bore 12 is filled with a shielding material, the shielding material functions both as insulation, providing additional shielding, and as a distance member.

The shielding may be electrical shielding, for example for preventing leakage current, or any other type of shielding depending on the signals and/or power being transmitted by the first cable 6 and the at least one second cable 7a, 7b.

When the nacelle 4 turns, the first cable 6 turns freely inside the interior bore 12 of the slip ring assembly 1. Due to the at least one slip ring 11 being rotatable in view of the stationary part 10 of the slip ring assembly 1, the first portion 7a of the at least one second cable may rotate freely when the nacelle 4 turns. Thereby, the risk for entanglement of the first cable 6 and the at least one second cable 7a, 7b is reduced. After having passed the slip ring assembly 1, the second portion 7b of the at least one second cable may be guided towards, for example, the tower wall or a ladder 19 arranged in the tower 3.

Figure 3:
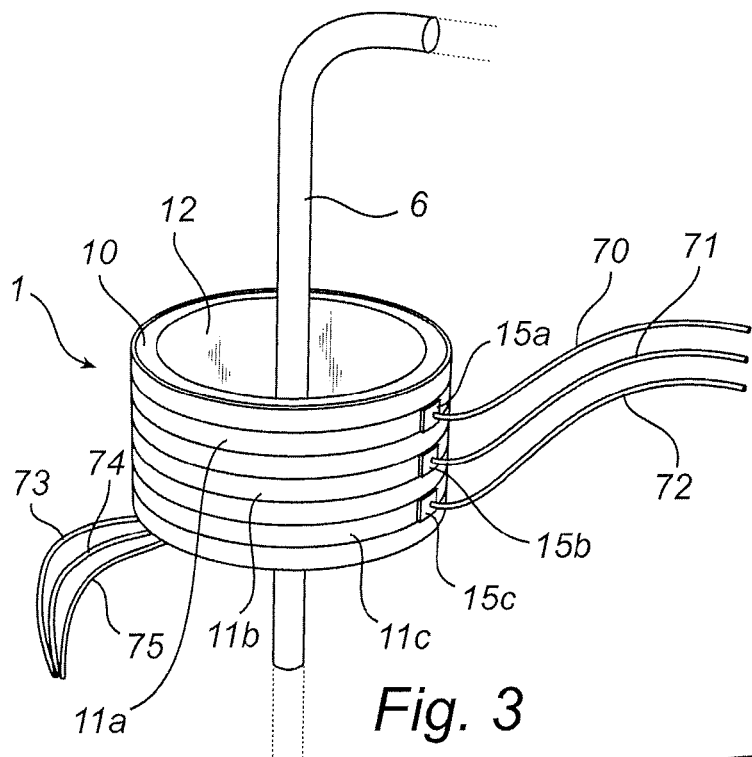
FIG. 3 schematically illustrates a slip ring assembly of a barrel type in more detail.

FIG. 3 schematically illustrates a slip ring assembly 1 of a barrel type. In this embodiment, first portions 70, 71, 72 of three second cables are connected to first terminals 15a, 15b, 15c of the slip ring assembly 1. In the barrel type slip ring assembly 1, each first portion 70, 71, 72 of the second cables is connected to a separate terminal 15a, 15b, 15c of a separate slip ring 11a, 11b, 11c. The slip rings 11a, 11b, 11c are arranged one on top of the other as shown in FIG. 3. As previously described, the slip rings 11a, 11b, 11c are rotatable in view of the stationary part 10 of the slip ring assembly 1. When the nacelle 4 turns, the slip rings 11a, 11b, 11c rotates in view of the stationary part 10. Signals and/or power are transmitted from the slip rings 11a, 11b, 11c via the slip ring brushes (not shown) to the stationary part 10, or vice versa. Second portions 73, 74, 75 of the second cables are connected to second terminals (not shown) of the stationary part 10 and are guided away from the first cable 6.

Figure 4:
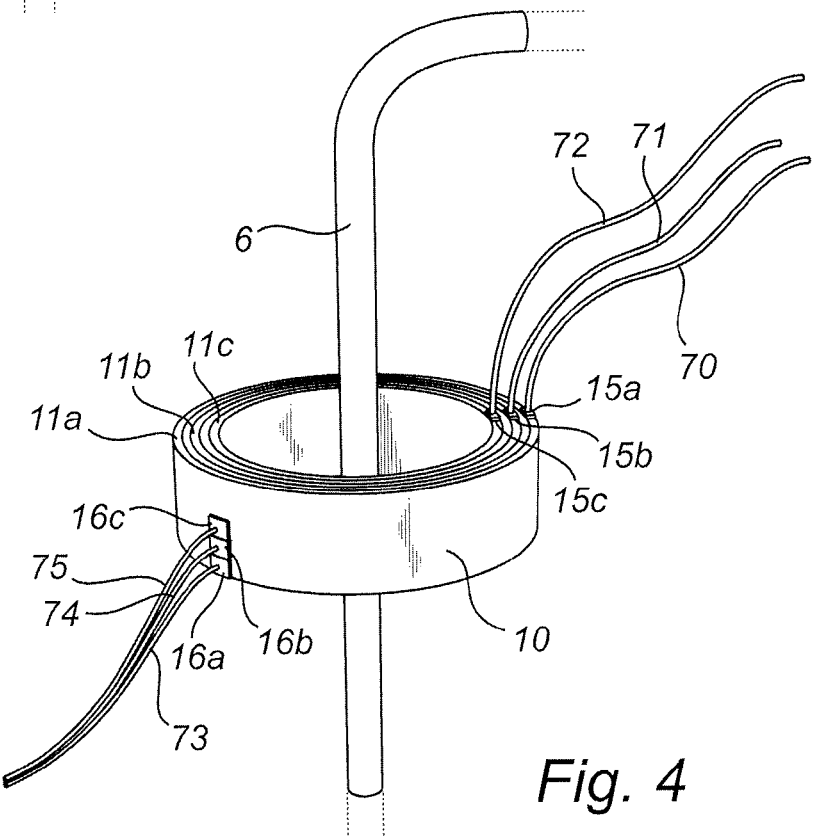
FIG. 4 schematically illustrates a slip ring assembly of a face type in more detail.

FIG. 4 schematically illustrates a slip ring assembly 1 of a face type. In this embodiment, first portions 70, 71, 72 of three second cables are connected to first terminals 15a, 15b, 15c of the slip ring assembly 1. In the face type slip ring assembly 1, each first portion 70, 71, 72 of the second cables is connected to a separate terminal 15a, 15b, 15c of a separate slip ring 11a, 11b, 11c. The slip rings 11a, 11b, 11c are arranged on a face of the slip ring assembly 1, as shown in FIG. 4. When the nacelle 4 turns, the slip rings 11a, 11b, 11c rotates in view of the stationary part 10 of the slip ring assembly 1. The slip rings 11a, 11b, 11c are electrically isolated from each other but are arranged on a face of the slip ring assembly. Consequently, the slip rings 11a, 11b, 11c rotate together. In another embodiment, the slip rings 11a, 11b, 11c may be separate units allowing the slip rings 11a, 11b, 11c to rotate independently of each other.

Signals and/or power are transmitted from the slip rings 11a, 11b, 11c via the slip ring brushes (not shown) to the stationary part 10, or vice versa. Second portions 73, 74, 75 of the three second cables are connected to second terminals 16a, 16b, 16c of the stationary part 10 and are guided away from the first cable 6.

The invention has mainly been described above with reference to a few embodiments. However, as is readily appreciated by a person skilled in the art, other embodiments than the ones disclosed above are equally possible within the scope of the invention, as defined by the appended patent claims.

For example, it is contemplated that the slip ring assembly may have any other shape, and consequently, the interior bore of the slip ring assembly may have any other shape. It is also contemplated that the slip ring assembly may be of any other type. Further, it is contemplated that more than one first cable may be extending through the interior bore of the slip ring assembly.

The invention claimed is:

1. A wind turbine comprising a tower, a nacelle arranged on top of said tower and a slip ring assembly having at least one slip ring, wherein a first cable is extending from the nacelle to the tower via an interior bore of the slip ring assembly, and at least one second cable is extending from the nacelle to the tower via said at least one slip ring, whereby a shielding distance is formed between an outer periphery of said first cable and an inner circumference of said at least one slip ring.

2. The wind turbine according to claim 1, wherein said at least one second cable is extending from the nacelle to the tower via said at least one slip ring by a first portion of said at least one second cable being connected to a first terminal of said at least one slip ring, and a second portion of said at least one second cable being connected to a second terminal of said slip ring assembly.

3. The wind turbine according to claim 2, wherein said second terminal is arranged on a stationary part of said slip ring assembly.

4. The wind turbine according to claim 1, wherein said shielding distance between a circumference of said interior bore and the outer periphery of said first cable is at least 130 mm.

5. The wind turbine according to claim 1, wherein the shielding distance is ensured by a distance member extending between the slip ring assembly and said first cable.

6. The wind turbine according to claim 1, wherein the slip ring assembly is of a barrel type or of a face type.

7. The wind turbine according to claim 1, wherein the slip ring assembly is attached to the nacelle.

8. The wind turbine according to claim 7, wherein the slip ring assembly is attached to a cable tray adapted to support said first cable.

9. The wind turbine according to claim 1, wherein the slip ring assembly is attached to the tower.

10. The wind turbine according to claim 1, wherein said slip ring assembly comprises said at least one slip ring and a stationary part, said at least one slip ring being attached to the nacelle and said stationary part being attached to the tower.

11. The wind turbine according to claim 1, wherein said at least one second cable is guided away from said first cable after having passed the slip ring assembly.

12. The wind turbine according to claim 1, wherein the first cable is a high voltage cable.

13. Use of a slip ring assembly comprising at least one slip ring for shielding cables in a wind turbine, wherein a first cable is extending through an interior bore of the slip ring assembly, and at least one second cable is extending via said at least one slip ring, whereby a shielding distance is formed between an outer periphery of said first cable and an inner circumference of said at least one slip ring.

14. Use of a slip ring assembly according to claim 13, wherein said at least one second cable is extending via said at least one slip ring by a first portion of said at least one second cable being connected to a first terminal of said at least one slip ring, and a second portion of said at least one second cable being connected to a second terminal of said slip ring assembly.

15. Use of a slip ring assembly according to claim 13, wherein the first cable is a high voltage cable.

16. A wind turbine comprising:
a tower;
a nacelle arranged on top of the tower; and
a slip ring assembly having at least one slip ring,
wherein a first cable extends from the nacelle to the tower via an interior bore of the slip ring assembly such that the first cable is electrically isolated from the at least one slip ring by a shielding distance formed between an outer periphery of the first cable and an inner circumference of the at least one slip ring, and
wherein the at least one second cable includes an incoming second cable portion extending from the nacelle to the at least one slip ring and an outgoing second cable portion extending from the at least one slip ring to the tower such that the incoming and outgoing second cable portions are electrically coupled via the at least one slip ring.

17. A method of arranging a first cable and a second cable from a nacelle to a tower of a wind turbine using a slip ring assembly having at least one slip ring and an interior bore, comprising:
extending the first cable through the interior bore of the slip ring assembly such that a shielding distance is formed between the outer periphery of the first cable and an inner circumference of the at least one slip ring so that the first cable is electrically isolated from the at least one slip ring; and
extending the second cable via the at least one slip ring, wherein an incoming second cable portion extends from the nacelle to the at least one slip ring and an outgoing second cable portion extends from the at least one slip ring to the tower, the incoming and outgoing second cable portions being electrically coupled by the at least one slip ring.

18. The method according to claim 17, further comprising maintaining the shielding distance between the outer periphery of the first cable and an inner circumference of the at least one slip ring using a distance member.

19. The method according to claim 17, wherein extending the at least one second cable via at least one slip ring associated with the slip ring assembly comprises the steps of connecting the incoming second cable portion to a first terminal of the at least one slip ring and connecting the outgoing second cable portion to a second terminal of the slip ring assembly.

20. The method according to claim 17, further comprising guiding the first cable away from the second cable after it has passed through the slip ring assembly.

* * * * *